(12) United States Patent
Lilja

(10) Patent No.: US 8,468,484 B2
(45) Date of Patent: Jun. 18, 2013

(54) LAYOUT METHOD FOR SOFT-ERROR HARD ELECTRONICS, AND RADIATION HARDENED LOGIC CELL

(75) Inventor: Klas Olof Lilja, Dublin, CA (US)

(73) Assignee: Klas Olof Lilja, Dublin, CA (US)

( * ) Notice: Subject to any disclaimer, the term of this patent is extended or adjusted under 35 U.S.C. 154(b) by 0 days.

(21) Appl. No.: 13/425,231

(22) Filed: Mar. 20, 2012

(65) Prior Publication Data

US 2012/0180005 A1 Jul. 12, 2012

Related U.S. Application Data

(63) Continuation-in-part of application No. 12/354,655, filed on Jan. 15, 2009, now abandoned.

(60) Provisional application No. 61/011,599, filed on Jan. 17, 2008, provisional application No. 61/011,989, filed on Jan. 22, 2008, provisional application No. 61/068,483, filed on Mar. 7, 2008, provisional application No. 61/123,003, filed on Apr. 5, 2008.

(51) Int. Cl.
*G06F 17/50* (2006.01)

(52) U.S. Cl.
USPC .......................................... 716/119; 716/122

(58) Field of Classification Search
USPC ................................................ 716/118–125
See application file for complete search history.

(56) References Cited

U.S. PATENT DOCUMENTS

| 6,278,287 | B1 | 8/2001 | Baze |
| 6,433,983 | B1 | 8/2002 | Fechner |
| 7,075,337 | B2 | 7/2006 | Wood et al. |
| 7,139,190 | B1 | 11/2006 | de Jong |
| 7,310,759 | B1 | 12/2007 | Carmichael et al. |
| 7,343,579 | B2 * | 3/2008 | Coxe et al. ..................... 716/101 |
| 7,515,452 | B1 | 4/2009 | de Jong et al. |
| 7,523,422 | B2 | 4/2009 | Zhu et al. |
| 7,529,118 | B2 | 5/2009 | Burleson et al. |
| 7,620,883 | B1 | 11/2009 | Carmichael et al. |
| 7,627,840 | B2 | 12/2009 | Kleinosowski et al. |
| 7,644,311 | B2 | 1/2010 | Lien et al. |
| 7,733,144 | B2 | 6/2010 | Guo et al. |
| 7,759,995 | B2 | 7/2010 | Ishii et al. |
| 7,773,442 | B2 | 8/2010 | Kapre et al. |
| 7,774,732 | B2 | 8/2010 | KleinOsowski et al. |
| 7,907,461 | B1 | 3/2011 | Nguyen et al. |

(Continued)

OTHER PUBLICATIONS

Calin et al. "Upset hardened memory design for submicron CMOS technology" 1996, IEEE, vol. 43, pp. 2874-2878.*

(Continued)

*Primary Examiner* — Binh Tat
(74) *Attorney, Agent, or Firm* — K&L Gates LLP

(57) ABSTRACT

This invention comprises a layout method to effectively protect logic circuits against soft errors (non-destructive errors) and circuit cells, with layout, which are protected against soft errors. In particular, the method protects against cases where multiple nodes in circuit are affected by a single event. These events lead to multiple errors in the circuit, and while several methods exist to deal with single node errors, multiple node errors are very hard to deal with using any currently existing protection methods. The method is particularly useful for CMOS based logic circuits in modern technologies (.ltoreq.90 nm), where the occurrence of multiple node pulses becomes high (due to the high integration level). It uses a unique layout configuration, which makes the circuits protected against single event generated soft-errors.

6 Claims, 15 Drawing Sheets

U.S. PATENT DOCUMENTS

| | | | |
|---|---|---|---|
| 2007/0050740 A1* | 3/2007 | Jacobi et al. | 716/5 |
| 2007/0141794 A1 | 6/2007 | Morris | |
| 2007/0236246 A1 | 10/2007 | Roper | |
| 2007/0242537 A1 | 10/2007 | Golke et al. | |
| 2008/0158747 A1 | 7/2008 | Voldman | |
| 2008/0290903 A1 | 11/2008 | Mo | |
| 2009/0204933 A1 | 8/2009 | Rezgui | |
| 2009/0322411 A1 | 12/2009 | Moyer et al. | |
| 2010/0264953 A1 | 10/2010 | Lilja | |

OTHER PUBLICATIONS

Calin et al.; "Upset Hardened Memory Design for Submicron CMOS Technology"; IEEE Transactions on Nuclear Science; vol. 43, No. 6, Dec. 1996, pp. 2874-2878.

Cannon et al.; "Multi-bit Upsets in 65nm SOI SRAMs"; IEEE 46th Annual International Reliability Physics Symposium, Phoenix, 2008, pp. 195-201.

Narasimham et al.; "Effects of Guard Bands and Well Contacts in Mitigating Long SETs in Advced CMOS Processes"; IEEE Transactions on Nuclear Science, vol. 55, No. 3, Jun. 2008.

Naseer et al.; "The DF-Dice Storage Element for Immunity of Soft Errors"; IEEE; University of Southern California, 2005, pp. 303-306.

Seifert et al.;"Multi-Cell Upset Probabilities of 45nm High-k + Metal Gate SRAM Devices in Terrestrial and Space Environments"; IEEE46th Annual International Reliability Phys.

* cited by examiner

LAYOUT METHOD FOR SOFT-ERROR HARD ELECTRONICS, AND RADIATION HARDENED LOGIC CELL

CROSS REFERENCE TO RELATED APPLICATIONS

This application is a continuation-in-part of currently pending application Ser. No. 12/354,655, filed Jan. 15, 2009. Further, this application claims the benefit of U.S. Provisional Application Nos. 61/011,599 filed Jan. 17, 2008; 61/011,989 filed Jan. 22, 2008; 61/068,483 filed Mar. 7, 2008; and 61/123,003 filed Apr. 5, 2008, which are incorporated herein by reference.

GOVERNMENT SUPPORT

This invention was made with Government support under W31P4Q-06-C-0097 awarded by DARPA and FA945-06-C-0383 awarded by DTRA. The Government has certain rights in the invention.

BACKGROUND OF THE INVENTION

1. Field of the Invention

This invention comprises a layout method to effectively protect logic circuits against soft errors (non-destructive errors) and circuit cells, with layout, which are protected against soft errors. In particular, the method protects against cases where multiple nodes in circuit are affected by a single event. These events lead to multiple errors in the circuit, and while several methods exist to deal with single node errors, multiple node errors are very hard to deal with using any currently existing protection methods. The method is particularly useful for CMOS based logic circuits in modern technologies (.ltoreq.90 nm), where the occurrence of multiple node pulses becomes high (due to the high integration level). It uses a unique layout configuration, which makes the circuits protected against single event generated soft-errors.

The problem of soft errors generated by single event transients (and single event upsets) is expected to increase drastically in ultra-deep submicron (.ltoreq.90 nm) technologies. Of particular significance is that logic circuits are expected to become much more sensitive to radiation generated soft-errors and possibly surpass memory as the major source of single event errors. Furthermore, the generation rate of multiple errors, multiple bit upsets (MBU), single-event multiple upset (SEMU) increases.

The main reason for this is that, with a higher feature integration and higher frequencies, the spatial distribution and pulse length of a single event transient (SET) becomes relatively larger, increasing the probability that an SET pulse is latched-in as a (soft-) error, or that SET pulses are generated simultaneously on several circuit nodes by one single event.

The problem with increasing soft-error rates is further complicated by the escalating cost of semiconductor design and manufacturing. The high cost involved in developing and maintaining a semiconductor FAB makes it highly desirable to use standard commercial semiconductor manufacturing also for applications that require a high radiation tolerance. Hence, there is a strong drive to develop efficient and robust radhard-by-design (RHBD) techniques for these applications.

Furthermore, the design process is also becoming very complex and expensive, and it would be highly desirable to be able to re-use standard design IP and libraries as much as possible for radhard applications.

2. Prior Art

Current radhard-by-design technology for single event errors include triplication (triple mode redundancy, TMR) or duplication (e.g., built-in soft-error resilience, BiSER). These circuits carry two or more redundant copies of a signal, and use some form of voting, or filtering, circuitry to determine the correct signal among the redundant signals. Filtering preventing a signal to pass in the case that one of the redundant signals is wrong (by comparing the value of the redundant signals), and voting circuits selects the correct signal from the majority among several (3 or more) redundant signals.

These techniques generate undesirable power and area overhead, and current versions of these techniques cannot handle MBUs or SEMUs. Error correction codes, ECC, for memory, which also (loosely) could be classified as RHBD, is more efficient than duplication/triplication and can, with additional overhead, handle multiple errors in memory circuitry. However, the application of a corresponding error correction to logic circuits is very limited and application specific (e.g., selective parity check or insertion of specialized checking circuit IP).

State-of-the art for layout techniques for soft-error hard design mainly consist of simple spacing and sizing, and in adding additional contacts.

BRIEF SUMMARY OF THE INVENTION

A radiation generated single event (soft-) error (SEE) occurs when the charge, generated in the semiconductor material by one or more (e.g. secondary) charged particles, is collected by contact areas on the semiconductor substrate. This leads to current pulses on the circuit nets, connected to these contact areas, which, in their turn, cause voltage pulses in the circuit which can upset a sequential element (latch, flip-flop) or propagate through combinational logic and be latched in as errors at the next sequential element in the circuit.

This invention comprises a unique new layout method, which takes advantage of the overall circuit response to a single event effect, and, furthermore, comprises circuit cells, with layout, which are protected against soft errors. The method uses an arrangement of critical contact areas in such a way that single event pulses in the circuit, that are generated on multiple nodes, act to oppose each other and hence cancel (or greatly reduce the effect of the single event). In the case that a primary and secondary circuit is used to maintain, or process the signal in a circuit, addition rules, described in section 4, are used, so that no possibility remains that a error is generated in both primary and secondary circuit, and hence that the combination of primary and secondary circuit will be fully error free.

DESCRIPTION OF THE DRAWINGS AND FIGURES

Table 1. The state for the nodes in a circuit that uses a primary (nodes n1,n2) and secondary (nodes n3,n4) circuit for storage or processing of the state.

Figure 4:
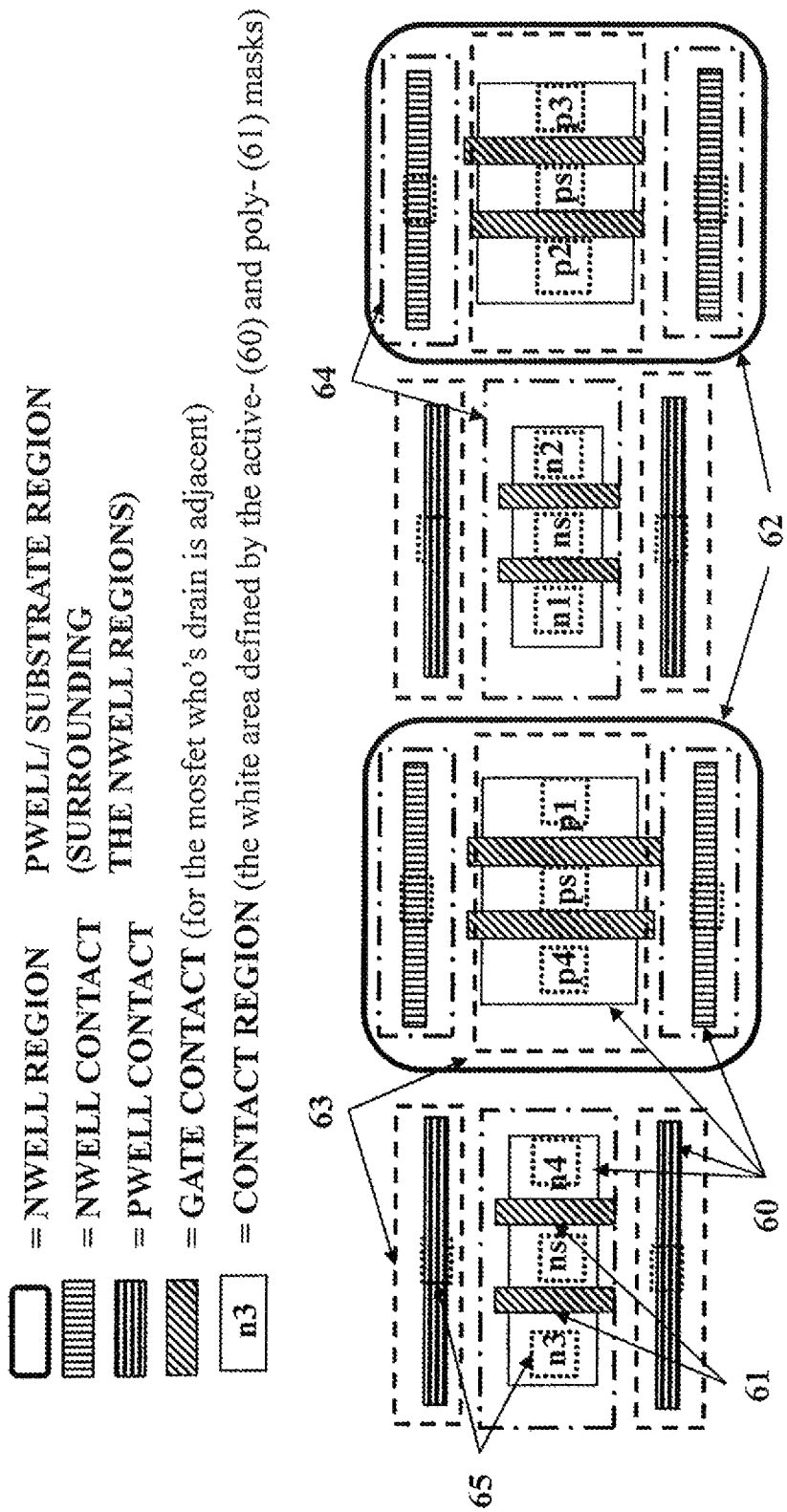

FIG. 4. A first preferred layout arrangement for the layout of the DICE latch cell. ns/ps are the source contacts for the two MOSFETss who's drains are adjacent. p1-p4 and n1-n4 are the pMOSFET drains and the nMOSFET drains of the 4 main storage nodes, respectively. Any cyclic simultaneous permutation of the n and p nodes will be equivalent (and part of the invention). The mosfets can be placed in separate active areas, or the adjacent n and p nodes can be placed in the same active area. The MOSFET sources can be placed in the line of the drains or in the direction vertical to the line of the drain nodes. The well contacts can be placed on either side only, or also surround the adjacent node pairs. The shapes numbered 60-65 shows the masks in the layout of the integrated circuit, which are used to form the contact areas.

An integrated circuit is designed by a creation of a complete representation of the circuit in a computer in the form of digital information. This representation consist of geometric shapes that make up the layout of the circuit, along with some information about how these shapes are organized and how they will be used in the manufacturing of the circuit. This digital representation of the circuit has a unique one-to-one physical transformation to the final integrated circuit. The transformation is realized by passing the data of the tape-out to manufacturing (e.g., to a semiconductor foundry), where the representation is converted to the final integrated circuit.

The geometrical shapes in the circuit representation are organized in masks, where each mask comprises a set of geometric shapes and is applied to define the structures and shapes on the final integrated circuit that are created in a certain step in the manufacturing process. A final shape in the integrated circuit can be defined by one mask or by a combination of two or more masks, depending on how the masks are used in the manufacturing process. In FIG. 4 the basic masks used in a modern semiconductor technology (MOS technology) for the formation of the semiconductor devices and their contact areas are shown. The active mask (60) is used in a etch step to define active areas where contacts and devices can be formed in the semiconductor substrate. After a deposition of additional material layers (insulator material and gate material) the poly mask (61) is used in an etch step to etch the additional material layers. The device contact areas (source and drain) are the active areas that are not covered by material after the etching using the poly (61) mask. The contact areas are therefore defined by the difference of the active mask and the poly mask. The poly mask regions which are inside the active regions will form the device gate contacts. A gate contact is not a connection to the substrate, but to the gate material, and is always defined as the region between two source and drain device contact areas.

The type of a contact area is defined by other masks which define where certain type of doping (impurities such as boron, phosphorus, arsenic, etc.), are implanted into the semiconductor substrate to form p-type and n-type regions. The n-well mask (62) defines regions where an n-type doping will be implanted into the substrate. These regions are the so called n-wells, and the contact regions inside the n-wells will either become device (source- and drain-) contact areas of p-type MOSFET devices, or so called well-ties (direct contact to the n-well doping region). The regions outside of the n-well mask (62) will be doped with a p-type doping, and form the so called p-wells. The contact regions inside the p-wells will either become device (source- and drain-) contact areas of n-type MOSFET devices, or so called well-ties (direct contact to the p-well doping region).

The so called p+-mask (63) and n+ masks (64), are used to determine where to implant additional doping. The p+-mask determines where to implant additional p-type doping. Contact areas inside the n-well and inside the p+-mask will form the device contact regions of the p-type MOSFETs, and contact areas inside the p-wells and inside the n+-mask will form the device contact regions for the n-type MOSFET devices.

The semiconductor devices in a MOS technology are fully defined by the basic masks (60, 61, 62, 63, and 64). In some technologies additional masks may be used for some special manufacturing step related to the device formation. However, the contact areas will be fully defined by the geometric shapes in a set of masks in the representation of the integrated circuit.

Additional masks are then applied to connect the contact areas with metal lines according to the schematics of the circuit. The contact mask (65) is one of masks used for this. It defines where a metal contact (a so called via) is created, which connects a device contact area to a metal line in a first metal layer above the semiconductor substrate. The connection to the gate contacts are defined by mask shapes in the same way as the device (source and drain) contact areas. Several metal layers are formed above the semiconductor substrate, each with a mask that defines the pattern (the metal lines) and with so called via masks that define where one metal layer is connected to another metal layer. The creation of the various metal- and via-masks is referred to as the routing. It simply implements the connections between the devices which are fully defined by the circuit schematics (or net list) which describes how the devices are connected to each other. The layout in FIG. 4 corresponds to the circuit schematic of the basic DICE circuit shown in FIG. 3, and contact areas are connected according to this circuit schematic. The notation of the contact areas in FIG. 4 show how the contact areas are connected; n1-n4 are the drain contact areas of the n-type MOSFETs that are connected to circuit net number 1-4 respectively, and p1-p4 are the drain contact areas of the p-type MOSFETs that are connected to circuit net number 1-4 respectively. The n-type MOSFET source contact areas are all connected to the circuit net VSS, and they are annotated ns in FIG. 4. Likewise the p-type MOSFET source contact areas are all connected to the circuit net VDD, and they are annotated 'ps' in FIG. 4. A finalized latch or flip-flop integrated circuit which uses the DICE schematics will contain additional MOSFET devices (e.g., to control the input and output of the latch or flip-flop—the signal clocking). These additional devices can be inserted in the layout in a straight forward manner according to the steps and rules in the layout methodology, such that the basic arrangement of all contact areas connected to net 1-4 remain the same, and such that all contact areas remain along a line in the layout.

Figure 5:
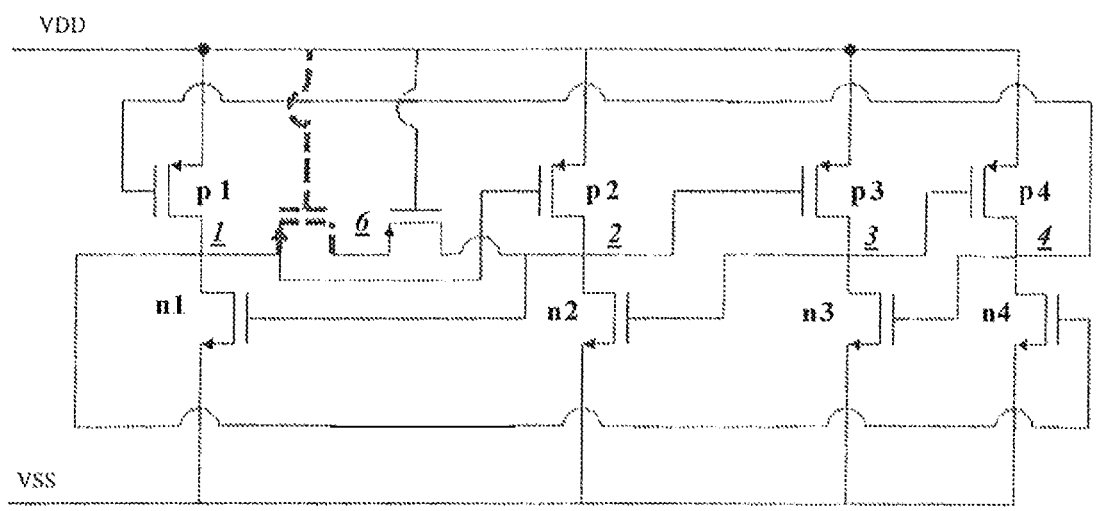

FIG. 5 shows a net-list corresponding to the second preferred arrangement. The dashed-line MOSFET may or may not be included, as long as node 6 is connected to drain 6*a* in FIG. 5, and p1 and 6*a* are physically separate.

Figure 6:
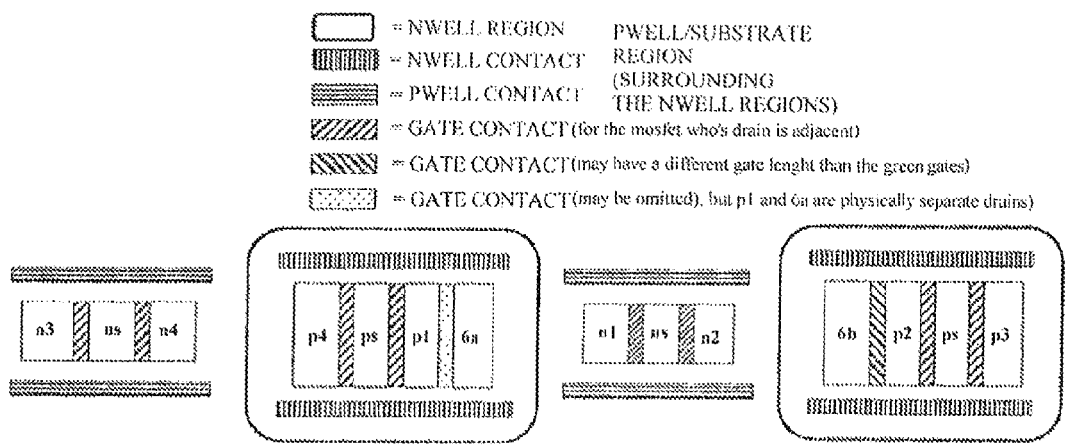

FIG. 6 shows a second preferred layout arrangement. ns/ps are the source contacts for the two mosfets who's drains are adjacent. Node 6*a* and 6*b* are connected. The dotted gate adjacent to node 6*a* may or may not be included (both variants included in the claims), but p1 and 6*a* are physically separate. The layout derives from the layout in FIG. 1, and the same variants w.r.t. node permutations, active, source, and well contact arrangements apply.

Figure 7:
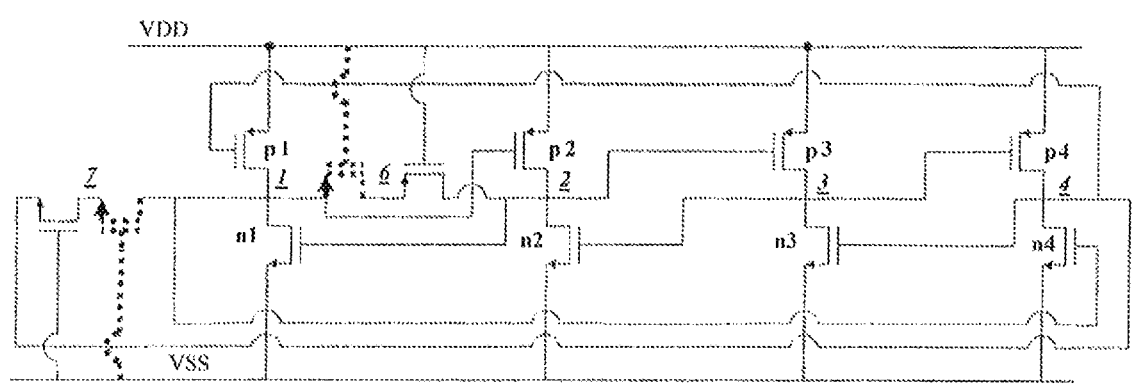

FIG. 7 shows a net-list corresponding to the third preferred arrangement. The dotted-line MOSFETs may or may not be included, as long as node 6 is connected to drain 6*a* in FIG. 4, and p1 and 6*a* are physically separate, and node 7 is connected to drain 7*a* in FIG. 4, and n1 and 7*a* are physically separate.

Figure 8:
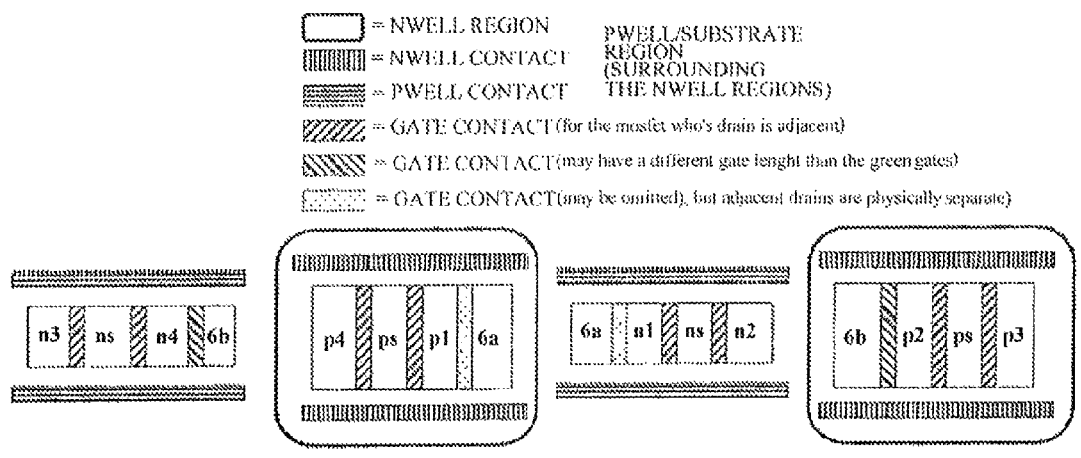

FIG. 8 shows a third preferred layout arrangement. ns/ps are the source contacts for the two mosfets whose drains are adjacent. Node 6*a*-6*b* are connected, as are node 7*a*/7*b*. The dotted gate adjacent to node 6*a* and 7*a* may or may not be included, but the adjacent drain areas, are physically separate.

Figure 1:
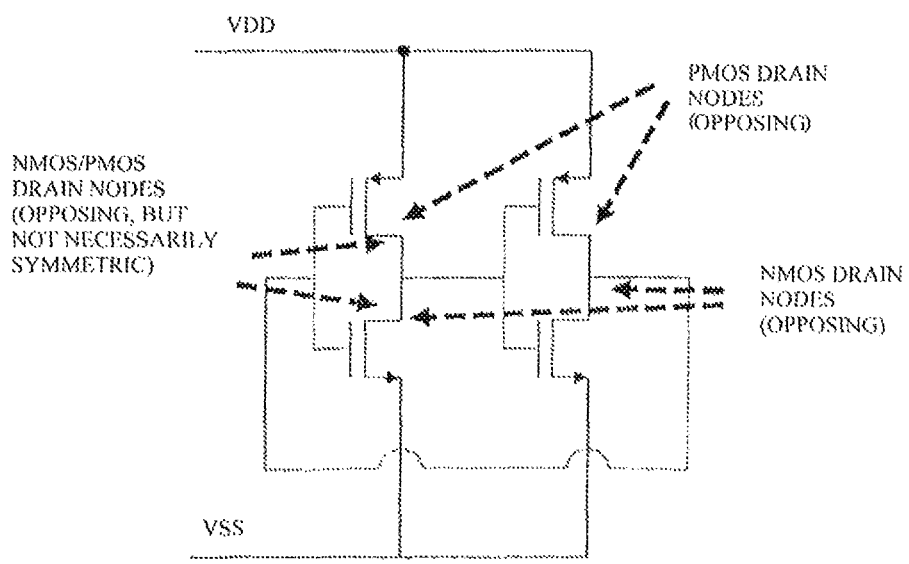
FIG. 1 shows primary opposing nodes in a latch cell.

The layout derives from the layout in FIG. 1, and the same variants w.r.t. node permutations, active, source, and well contact arrangements apply.

Figure 9:
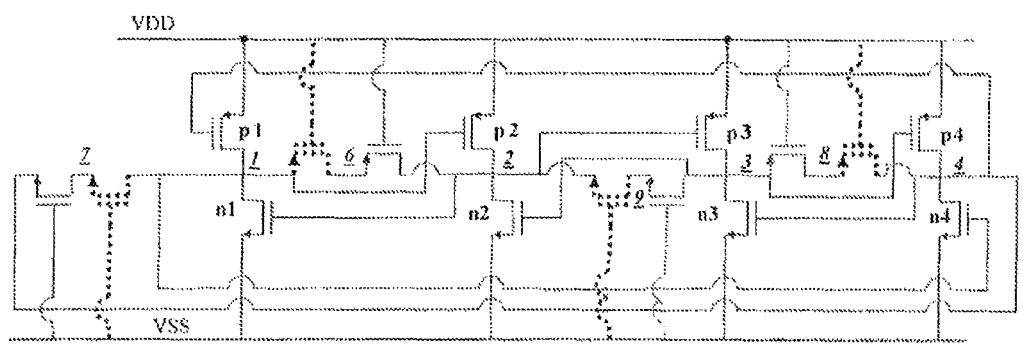

FIG. 9 shows a net-list corresponding to the fourth preferred arrangement. The dotted-line MOSFETs may or may not be included, as long as node 6 is connected to drain 6a, 7 to 7a, 8 to 8a, and 9 to 9a in FIGS. 8, and 6a, 7a, 8a, 9a are physically separate from their adjacent main drain node.

Figure 10:
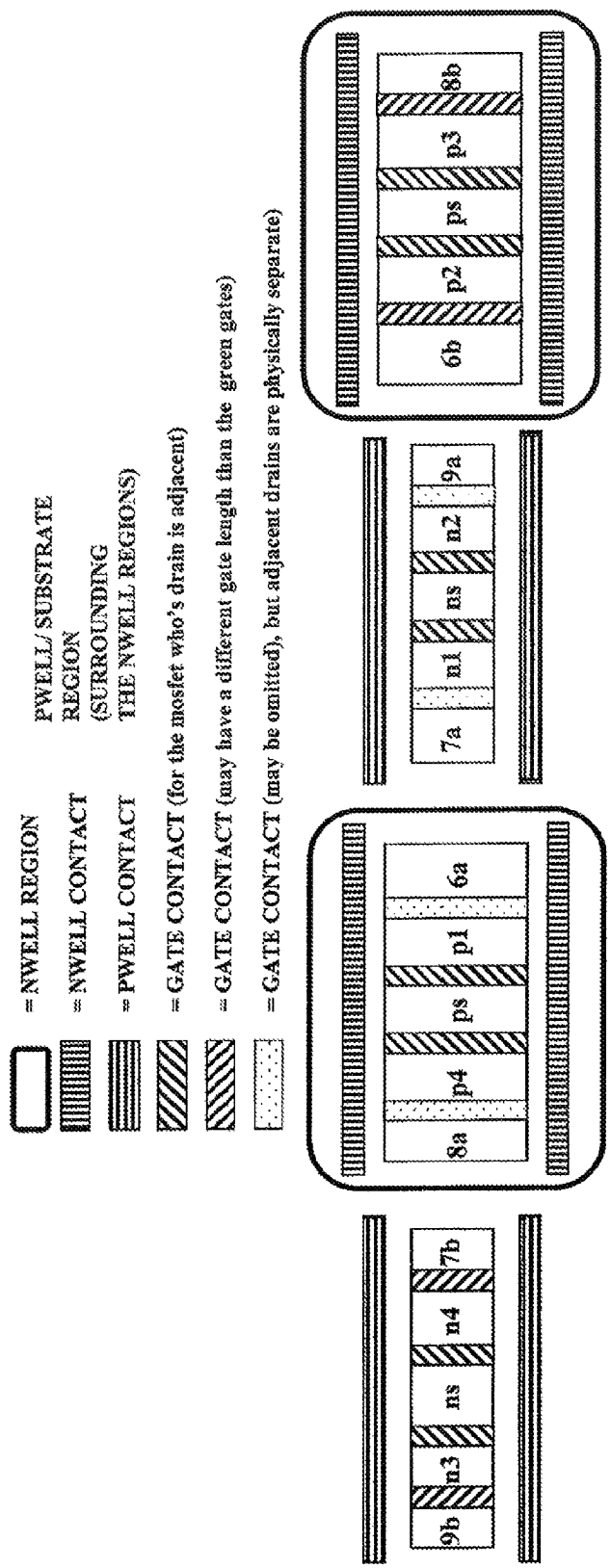

FIG. 10 shows a fourth preferred layout arrangement. ns/ps are the source contacts for the two mosfets whose drains are adjacent. Node 6a/6b, 7a/7b, 8a/8b, and 9a/9b are connected. The dotted gates adjacent to nodes 6a, 7a, 8a, 9a may or may not be included (both variants included in the claims), but nodes 6a, 7a, 8a, 9a are physically separate from their adjacent MOSFET drains. The layout derives from the layout in FIG. 1, and the same variants w.r.t. node permutations, active, source, and well contact arrangements apply. Naturally the claims may include the various additional variants where and combination of the extra nodes 6a/6b, 7a/7b, 8a/8b, 9a/9b have been included or omitted.

Figure 11:
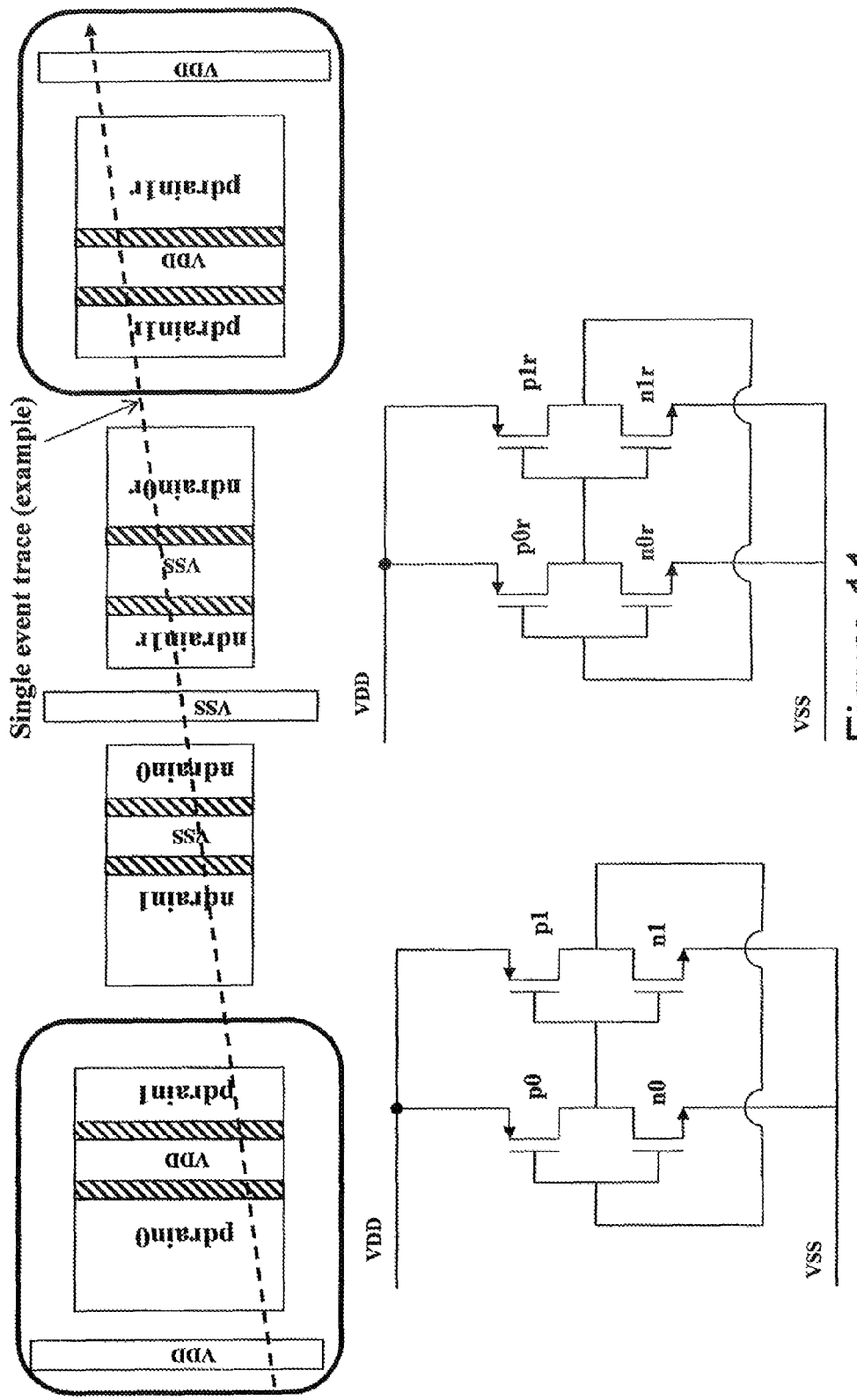

FIG. 11 shows a circuit schematic and layout for duplicated latch cells (e.g. for BISER) using placement and sizing to ensure complete hardness against single and multiple node single event effects. For a single event affecting several nodes, the primary latch can only be upset when node 1 is HIGH, and the redundant latch can only be upset when node 1 (r) is LOW. Hence, any single event that affects both latches, can only upset one of the two latches in the BISER configuration, and therefore, cannot generate an error.

Figure 12:
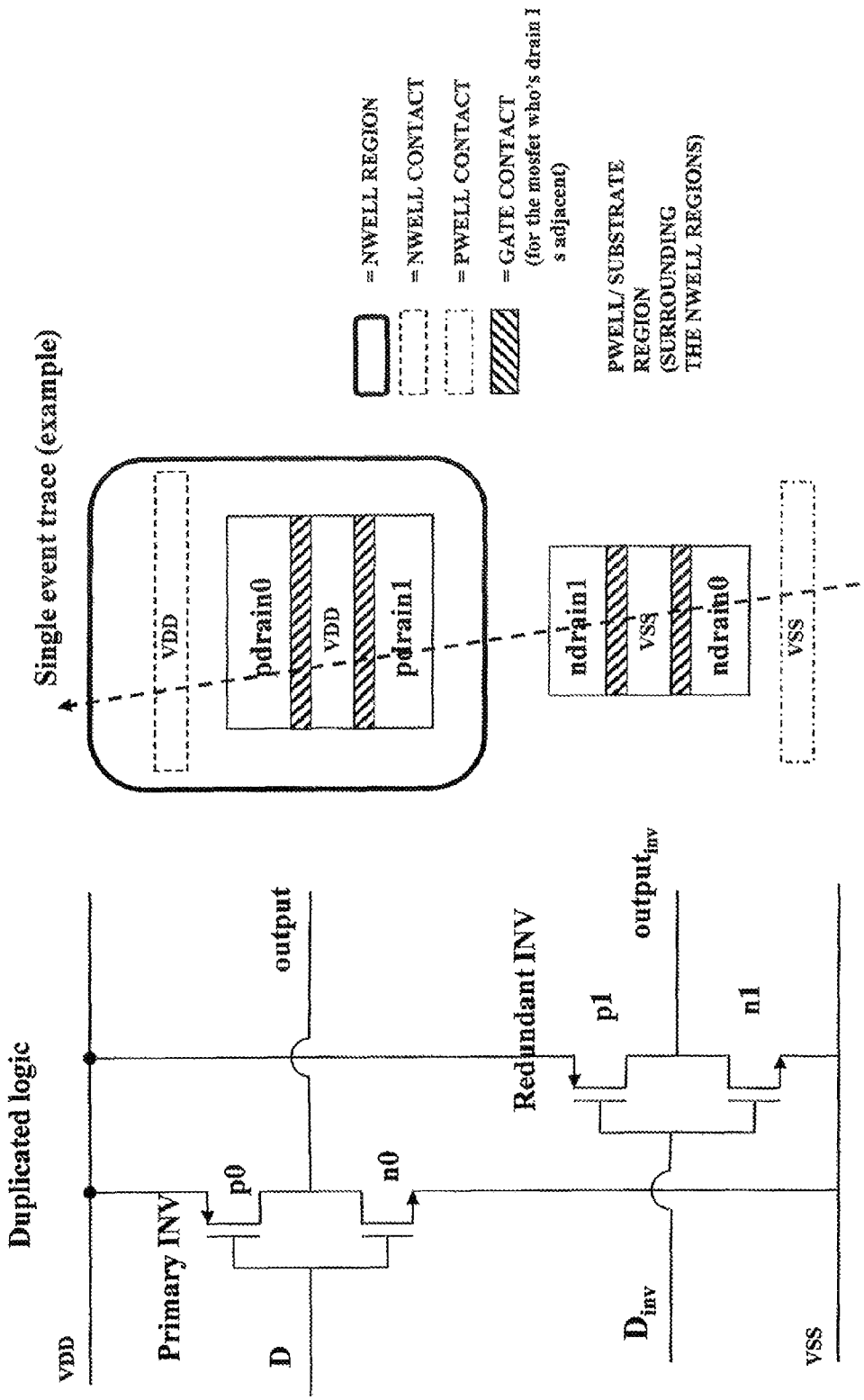

FIG. 12 shows an example of a duplicated circuit. In a duplicated inverter where the redundant and primary nodes carry opposite states, error signals on both primary and redundant nodes can be generated if both ndrain0 and pdrain1 are affected (if D is high) or if both ndrain1 and pdrain0 are affected (D low). By placing the nodes such, that if a particle trace goes through two nodes that can cause an error transient on both primary and redundant output, then the trace also passes through the other nodes and the pulse on one of the nets are suppressed. For example, consider the trace in the figure; if node 0 is high, the charge collected on ndrain0 will pull node 0 low (error transient), the charge collected on node pdrain1 will pull node 1 high, however, the charge collected on node ndrain1 will pull node 1 low, opposing the effect on pdrain1, and keeping node 1 low (i.e., preventing the transient on node 1). If node 0 is low, the charge collected on node ndrain1, will pull node 1 low (error transient), however, the charge collected at ndrain0, will keep node 0 low (i.e., preventing a transient on node 0). It should be pointed out that in the general case there will be some pulses on all nodes; however a full swing pulse (a transient that can propagate) can only be generated on one, and one only, of the duplicated nodes.

Figure 13:
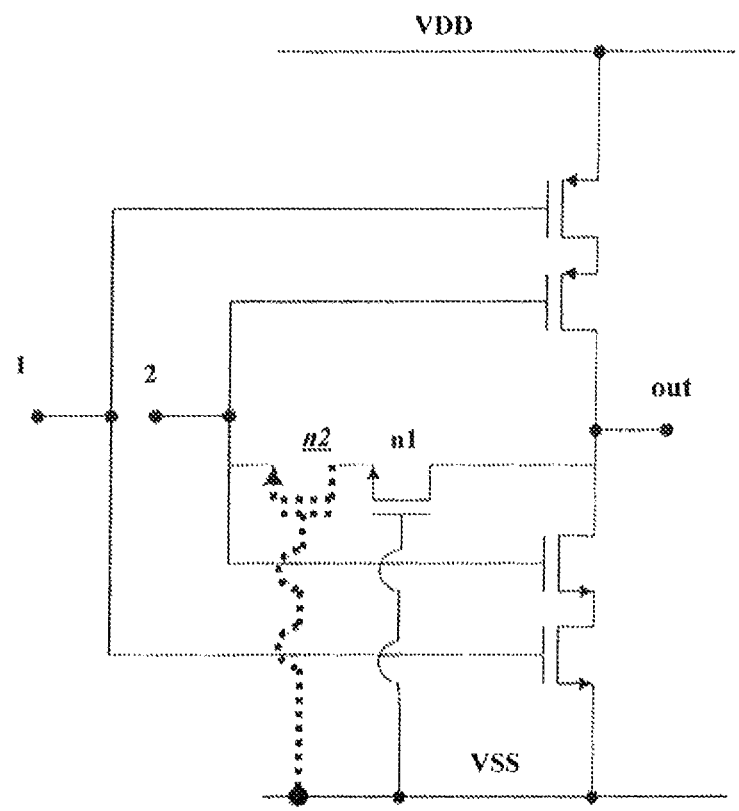

FIG. 13 shows another (not DICE) example of the addition of such protective devices for a c-element filtering circuit.

Figure 14:
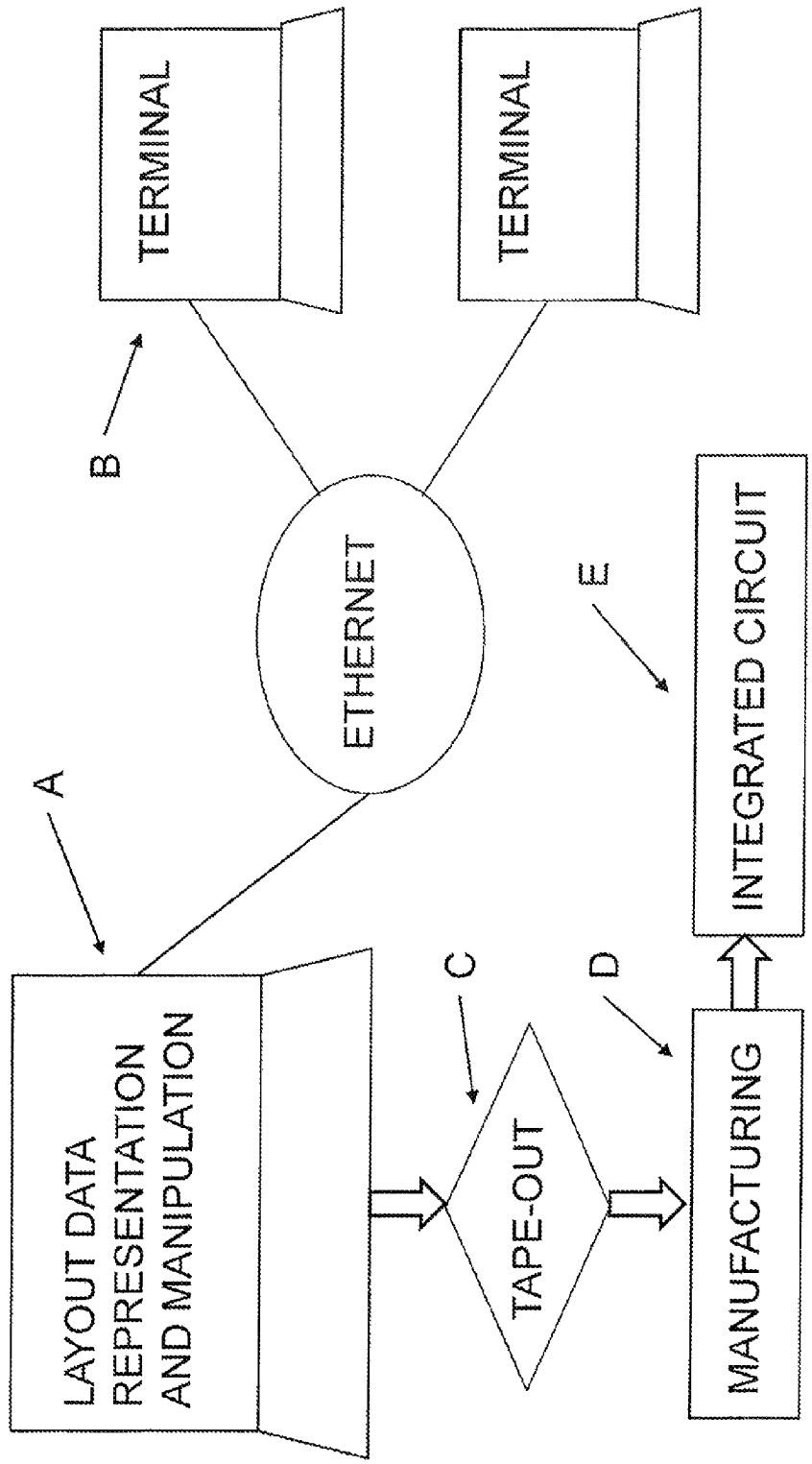

FIG. 14 is a system configuration diagram for carrying out an exemplary embodiment of the present invention. The layout apparatus system comprises a computer server A. The computer server A is connected via a network, such as Ethernet, to terminal devices B for input of data and commands. Inside the computer server, represented as digital information in computer memory, resides a representation of the integrated circuit. In particular, a representation of the geometrical shapes of the layout of the integrated circuits, which fully specify the integrated circuit, reside in memory in A. Furthermore, the instructions to manipulate the layout shapes based on the rules as presented herein reside in the computer memory and can be executed to carry out the manipulation of the layout shapes. The computer server A has an output device where the completed layout for the integrated circuit is output to a storage medium (aka tape out, C). The geometric shapes in the layout of the integrated circuit have a unique one-to-one physical transformation to the final integrated circuit. This transformation is realized by passing the data of the tape-out to manufacturing (e.g., to a semiconductor foundry), D, where the layout of the tape-out, C, is converted to the final integrated circuit, E.

The method includes designing a circuit layout of an electronic integrated circuit, the circuit comprising component contact areas, voltage states, and nets, the method being embodied in a data processing apparatus having at least an arithmetic processor and memory. It can also include designing a mask layout of the integrated circuit, the mask layout based on the circuit layout designed using this method, and storing the mask layout in the data processing apparatus memory.

Further, the method of designing a circuit layout of an electronic integrated circuit can further comprise a non-transitory computer-readable medium storing a computer program for causing a computer to perform at least one of the steps in the method.

Figure 15:
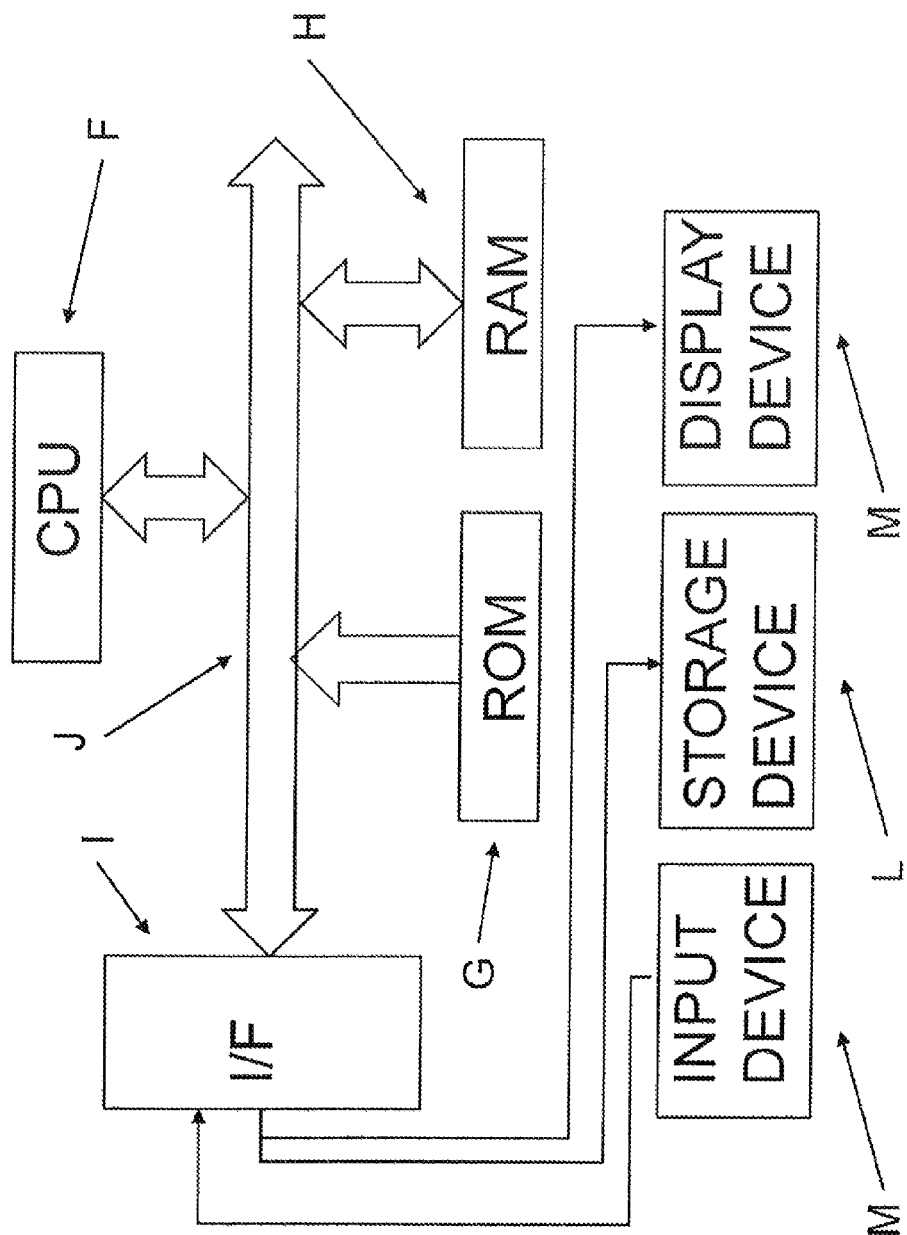

FIG. 15 is a diagram illustrating the hardware structure of the layout apparatus A. As shown in FIG. 15, the layout apparatus A includes a CPU F for controlling arithmetic operations and the system on the basis of a control program, a ROM G for storing, for example, a control program for the CPU F, a RAM H for storing data read out from, for example, the ROM G or the results of the arithmetic operations needed for the CPU F to perform arithmetic processing, and an I/F I for transmitting/receiving data to/from external devices. These components are connected to one another via a bus J, which is a signal line to transmit data, so as to be capable of sending and receiving data.

External devices, such as an input device K composed of a keyboard or a mouse, serving as a human interface, capable of inputting data, a storage unit L for storing data or tables in the form of files, and a display device M for displaying an image on the basis of image signals, are connected to the I/F I.

Next, the data structure of content is described. It comprises representations of the integrated circuit as is standard in modern electronic design. In particular it contains the geometric shapes that make up the layout of the circuit. These are organized in masks which will be used, typically in an automated process, to perform the physical transformation of the computer representation of the integrated circuit to the integrated circuit itself. The geometric shapes in the layout form electronic devices and connections between electronic devices. In particular a well-defined sub-set of these shapes form the contact areas of each of these devices. By manipulating the coordinate position of these shapes and their size (stored digital information in RAM H or on the DISK L) the position and shape of the contact areas of the integrated circuit can be manipulated.

The instructions to manipulate the geometric shapes in the layout according to the rules described herein also reside in memory in the computer. When they are executed, certain shapes in the layout of the electronic circuit are moved and changed, resulting in a change of position and/or shape of the contact areas of the electronic circuit.

When all manipulations have been completed, a new layout exists that has specific characteristics and allow for a direct physical transformation to the final integrated circuit as described above.

DETAILED DESCRIPTION OF THE INVENTION AND HOW IT WORKS

This invention comprises a unique new layout method, which takes advantage of the overall circuit response to a single event effect. It also includes specific circuit cells with layout, which have been constructed in accordance with the new layout method.

A radiation generated single event (soft-) error (SEE) occurs when the charge, generated in the semiconductor material by one or more (e.g. secondary) charged particles, is collected by contact areas. The contact areas are the low resistivity regions on, or in, the semiconductor substrate, which are connected to a net in the circuit, e.g., the source and drain areas in a MOSFET technology. A circuit net (or node) refers to a part of the circuit, connected by low resistivity regions (metal), which maintains a certain voltage value (referred to as the voltage state of the net) throughout its' extent. A net can be connected to any number of contact areas.

The charge collected by contact areas during a single event, leads to current pulses in the circuit, which, in their turn, cause a change in the voltage of the circuit nets, connected to these contact areas, i.e. a voltage pulse in the circuit. These pulses can upset a sequential element (latch, flip-flop) or propagate through combinational logic (i.e., a set of digital logic gates) and be latched in as errors at the next sequential element in the circuit.

The effect of a single event on the voltage on the circuit net, is different for different contact areas, e.g., a single event can have the effect of increasing the voltage on the net connected to the contact area, or decreasing it, depending on where the contact areas are located in substrate, and how they are connected to the circuit. The method in this invention uses an arrangement of contact areas in such a way that single event generated pulses in the circuit, that occur on multiple contact areas, acts to oppose each other, w.r.t. the effects they have on the voltage of the circuit nets, and hence cancel (or greatly reduce the effect of the single event).

The method also comprises an adjustment to the strength of the effect that a single event has on the voltage of the circuit nets, total effect on the circuit. This adjustment can be achieved by changing the sizes of the contact areas, and by changing their positions relative to other components in the layout.

The method can be applied to sequential logic elements (latches, flip-flops, memory cells), to combinational logic (a connection of one or more digital logic gates), or to analog circuit cells.

In the following two sections details of two specific ways to apply the method are described. The first, section, uses a placement and strength adjustment, such that the single event effects, on several contact areas, cancel each other out, in terms of their effect on the circuit nets they are connected to. The second section, uses a placement and strength adjustment, such that two or more redundant nets in the circuit are affected differently by a single event, in such a way that a single event cannot simultaneously change their voltage state on several of the redundant nets.

A. Layout Method Using Symmetric Arrangements

Method 1

The key steps in method one of the invention are:
1. Identify which contact areas have opposing effects on the circuit nets when they are simultaneously affected by a single event.

2. Place these nodes in the layout next to each other, and in a fully symmetric way with respect to other adjacent contact areas.
   a. In particular in a CMOS technology the contact are configured in a symmetric (equivalent) position w.r.t. well junctions and well contacts.
   b. if the two contact areas are part of a sequential element (e.g., a latch), this arrangement ensures that these two nodes cannot be upset by a single event that affects both areas, i.e., an event which has an extended charge (e.g., as generated by a charged particle passing through) which is in such a direction that it affects both these nodes.
   c. If nodes are part of a combinational element, the arrangement ensures that the generated output pulse is greatly suppressed, when the generation single event affects both nodes, i.e., an event which has an extended charge (e.g., as generated by a charged particle passing through) which is in such a direction that it affects both these nodes.

3. In an element using additional protective circuitry (redundant nets), place the contact areas of the redundant nets in a direction, such that when the charge from one single event affects both primary and redundant nets, it is in the direction that always also affects both opposing nodes in either the primary or the secondary circuit, or that affects the opposing node of both primary and secondary circuit.

Specifically for CMOS technology, step one and two above would use the following to characterize the effect of a single event on a source or drain contact area:
   a. When a n-drain (or source) is affected by a single event, the effect of the single event is to reduce the voltage on the net connected to this contact area, i.e., if the node is high it will tend to switch the voltage; and when the node is low, it will not tend to switch the voltage.
   b. When an p-drain (or source) is affected by a single event, the effect of the single event is to reduce the voltage on the net connected to this contact area, i.e., if the node is low it will tend to switch the voltage; and when the node is high, it will not tend to switch the voltage.

Also, specifically for a CMOS technology, step 3 above, would use the following rules for two nodes, each connected to a net carrying redundant signals (primary and secondary nets).
   a. When two n-drains (or sources), one connected to the primary net and one to the secondary net, are affected by a single event, and they always have opposite voltage states, then only one of the primary/secondary nets can be upset (i.e., change its' voltage).
   b. When two p-drains (or sources), one connected to the primary and one to the secondary net, are affected by a single event, and they always have opposite voltage states, then only one of the primary/secondary circuits can be upset.
   c. When an n-drain (or source) from one net, and a p-drain (or source) from the other net are affected by a single event, and the nets connected to these drains (sources) always have the same voltage state, then only one of the primary/secondary nets can be upset.

B. Layout Method Using Asymmetric Arrangements

Method 2

For the case of an element that uses primary and redundant nets to store the state (i.e., the voltage or signal), an alternative to synthesizing a layout where single event effects cancel each other out, is to deliberately let one of the contact areas be stronger w.r.t. single event charge collection. This contact area will then always determine the outcome of a single event on the connected net (e.g., for a p-drain it would always end up HIGH (at Vdd)). FIG. 11 shows the schematic of a circuit with a first primary latch and a second redundant latch. Here, there are four nets that store the state (first and second primary nets and first and second redundant nets). This includes a first primary net connected to a dominant contact area, and a second primary net connected to a non-dominant contact area. The first redundant net is connected to a dominant contact area, and the second redundant net is connected to a non-dominant contact area. The nets that are connected to the dominant contact areas (e.g. the first primary net and the first redundant net) store the opposite state to each other. This configuration allows only one of the two circuit parts, either the primary or the redundant, to change its state (become upset) by an event that affects both circuit parts. Using this variant, the layout method would be as follows:

For designs that use primary and redundant nets to store a state:

a. Identify which contact areas have opposing circuit effects when they are simultaneously affected by a single event (in the primary as well as the redundant part)

b. Place these nodes in the layout next to each other, and make one of the nodes dominant w. r. t. a single event (e.g., by making the drain area larger, and changing the distance to the well junction and the well-ties).

c. Make sure that the net connected to the dominant contact area of the primary circuit part, stores the opposite state to the net connected to the dominant contact area in the redundant circuit part.

d. Place the primary and redundant contact areas, relative to each other, in such a way that a single event that affects both the primary and redundant circuitry, also always affects both the dominant and the non-dominant nodes in the primary and in the redundant part.

(i) In this way, either the primary or the redundant part will be in a state where the dominant node will ensure this circuit part cannot be upset (i.e. change its state or voltage). Hence, in any situation only ONE of the redundant parts can be upset by a single event.

C. Discussion, Clarification, and Specific Circuit Cells

In a basic sequential logic circuit element (latch, sram-type memory cell, etc.) there are two main nets that maintain the state. These will always have opposite state (voltage). FIG. 1 shows the schematics of the fundamental components of a latch circuit implemented in a CMOS technology. In this latch, each of the two (main) nets are connected to two contacts areas in the layout (the nmos device drain and the pmos drain).

In this configuration the contact areas that will have opposing effects with respect to the state of the latch, when affected by the same single event, can be identified as (step 1 above):

a. A single event that affects both pmos drains will have opposing effects on the state of the latch;

b. A single event that affects both nmos drains will have opposing effect on the state of the latch;

c. A single event that affects both nmos and pmos drain of the same node will have opposing effect on the state of the latch.

Figure 2:
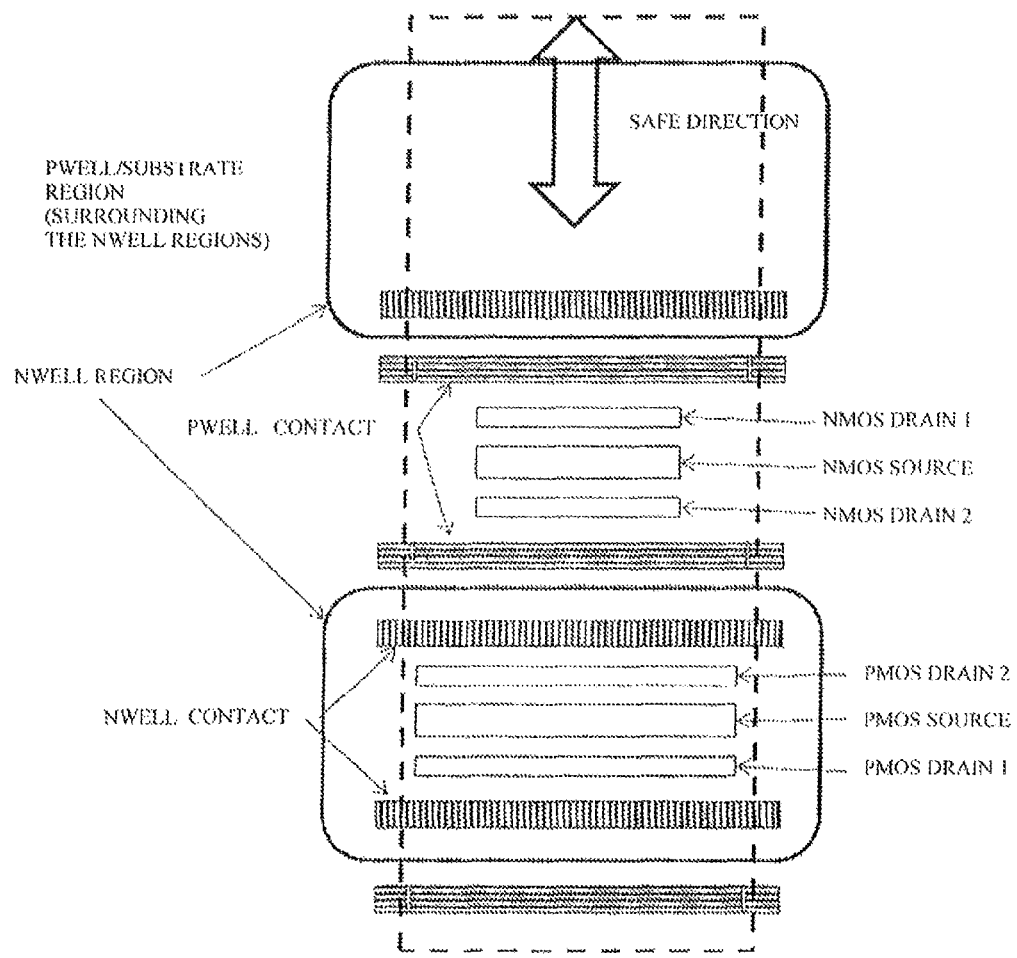
FIG. 2 shows a principal arrangement of opposing node of a latch circuit.

In the symmetric method, we arrange the layout such that drains, with opposing effects, are placed next to each other, in a symmetric arrangement (i.e. symmetric w.r.t the surrounding layout, and having the same shape). This is step 2 in the methodology number 1 above. FIG. 2 shows such an arrangement where we have utilized the first two of the opposing contact area identifications above, to create a latch that cannot be upset if the single event [has such a directions that is passes] the two nets of the circuit.

Step 3 in methodology number 1, as well as method number 2, concerns the case when an additional (redundant) circuit (here a latch) is available. In a circuit configuration that uses two latches to maintain the states, there will be four main nodes, n1, n2, from the primary latch, and n3, n4, from the secondary latch. The nodes from one latch will be in opposite states, and, during correct circuit operation, each node in the primary latch will always have the same state as one node in the secondary latch. This situation is shown in table 1, where n1 and n3 maintain the same state, and n2 and n4 maintain the same state.

According to step 3, the nodes of the second latch are now placed, w.r.t. the first latch, such that when an extended event occurs that affects both latches, it will be in a direction which affects both opposing nodes in each individual latch, or at least in one of them. FIG. 11 shows such an arrangement, where the method with dominating nodes (methodology 2 above) has been used, and the two latches have been placed in such a way relative to each other that at the most, one of the latches can be upset by any single event, but not both.

The same situation applies to other sequential elements (e.g., memory cells), and the method applies to these elements as well. The method also applies to elements which use more than 2 nodes to maintain the state, as well as non-sequential elements with a primary and secondary redundant net.

TABLE 1

The state for the nodes in a circuit that uses a primary (nodes n1, n2) and secondary (nodes n3, n4) circuit for storage or processing of the state.

| Node: | n1 | n2 | n3 | n4 |
|---|---|---|---|---|
| State 0 | 0 | 1 | 0 | 1 |
| State 1 | 1 | 0 | 1 | 0 |

To extract the correct signal from the two or more redundant nets, a filtering (or voting) circuit is used. The filtering ensuring that at any time where one of the redundant nets are wrong (e.g., for the redundant nets carrying the same voltage state; if the voltage states differ) the signal is not allowed to pass through the filtering circuit. The Built-In Soft Error (BISER) design [Mitra2005] is an example of such a configuration. A voting circuit, being used on at least three redundant circuits, performs a vote between the voltage states of the redundant nets. Triple mode redundancy (TMR) configurations use this type of redundancy.

Figure 3:
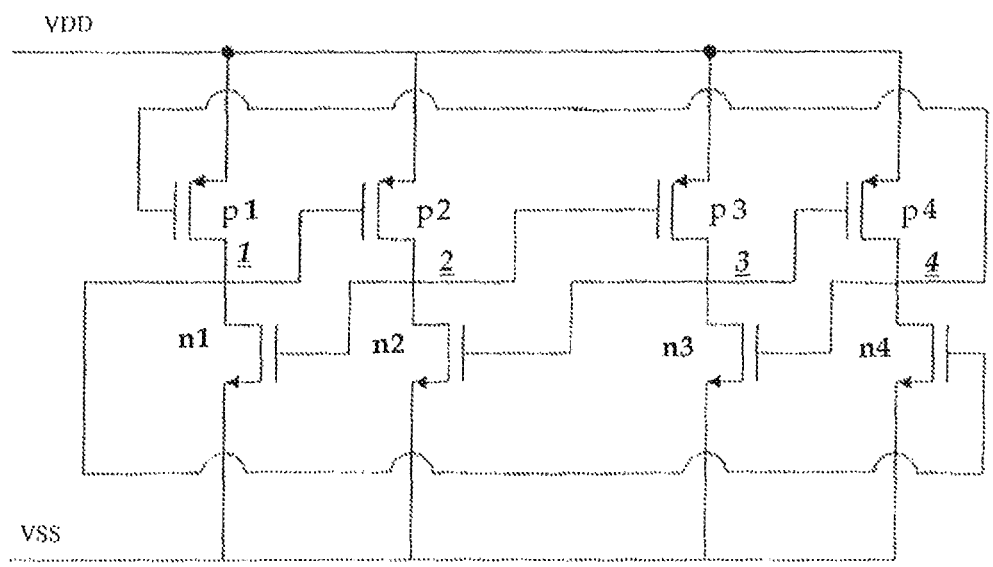
FIG. 3 shows a basic netlist for the DICE latch cell (prior art [Nic05]) with nodes 1-4. p1-p4 and n1-n4 are the pMOSFET drains and the nMOSFET drains, respectively.

This invention also comprises several specific DICE cells, created using the layout method. The DICE (Dual Interlocked Cell) latch [Nic2005], the circuit of which is shown in FIG. 3, also uses four nets to store the circuit state, but as can be seen in FIG. 3, they are not connected as two separate latches, but in an interlocked way.

The principal arrangement of the four storage nets of the DICE cells in this inventions, is that the contact areas of the nets are placed along one direction (e.g., FIG. 4), and that they have a certain order that minimizes or removes the effect of the single event, and hence reduces or removes the possibility that the storage element can be upset by a single event. The first variant (variant 1) is shown in FIG. 4. In this variant the MOSFET pairs have been placed in the same active area with a common MOSFET source contact in-between. However, they can also be placed in separate active areas, using separate sources contacts, and they can also be oriented so that the sources are perpendicular to the direction of the drain nodes.

In variants 2-4 (FIGS. 5-10) protective nodes have been added. They act to protect certain sensitive node-pairs and are not (necessarily) active during normal circuit operation. However, they can also be used as active devices connecting their gates to other storage nodes. For example, while variant 1 is much more robust than the normal layout (which does not have other nodes in between the sensitive node pairs), there is still some single event sensitivity remaining, the main being for the node pair p1-n2. By extending variant 1 as shown in FIGS. 5-6, the node pair p1-n2 is also protected. This is variant 2. The most sensitive node pair in variant 2 is the n1-p4 node pair, which is protected with the extension in variant 3 (FIGS. 7-8). Finally the latch can be made symmetric by adding additional protective nodes. A fully symmetric arrangement of protective nodes is shown in FIGS. 9-10 (third variant).

The addition of additional protective MOSFETs has a general application to circuits which use redundant nets. In the same way as in the case of the DICE circuit, they can be used to keep the state of a circuit node that becomes floating (not connected to the power, i.e., to VSS or VDD) during a single event. Floating nets become very sensitive to the single event charge, their voltage state can change very easily (i.e., even by very weak interaction with the single event). The additional protective devices, even if they just turn on partially during the single event, will make the nodes that become floating during a single event much more stable.

The invention also comprises a combinational circuit where all, or some of the nets have been duplicated, in such a way that there is one (primary) net that carries the signal, and a second (redundant) net carries the inverse of the signal on the primary net (i.e., when the voltage on the primary net is high, the voltage on the redundant net is always low, and vice versa). Further, in accordance with the layout method, where the contact areas of the primary and redundant net are placed in such a way that when a single event affects both nets, a voltage pulse can only be generated on one of the nets, but not on both. For this type of duplicated combinational circuit, filtering also needs to be applied to the outputs (at some point before the signal is latched into a single sequential element), which prevents propagation of a signal, unless both nets have their correct state (i.e., one being the inverse of the other). Alternatively sequential elements can also be duplicated, and an error detection and correction added at some point in the circuit (an error being identified by comparing the signal on the two redundant nets). This type of duplicated combinational circuit is shown in FIG. 12.

The invention claimed is:

1. A method of designing a circuit layout of an electronic integrated circuit, the circuit comprising component contact areas, voltage states, and nets, the method being embodied in a data processing apparatus having at least an arithmetic processor and memory, the method comprising the steps of:
   a. determining the effect on the voltage state of one or more nets in the circuit, due to a single event occurring near each contact area, for each contact area in the circuit;
   b. categorizing the contact areas in such a way that contact areas for which a single event have opposing effects on the voltage state of the nets in the circuit, and for which a single event has a non-opposing effect on the voltage state of the nets in the circuit, are identified;
   c. placing these contact areas in such a way that when a single event has opposing effects on the voltage state of the circuit nets, the opposing first and second contact areas are placed as close to each other as permitted by the circuit and by the design rules;
   d. placing a first contact area and a second contact area, with non-opposing effects on the voltage state of the nets in the circuit, said non-opposing effects caused by a single event, wherein the first and second contact areas are non-adjoining, and placing a third contact area in between the first and second contact areas, wherein said third contact area has an effect on the voltage state of the nets in the circuit opposing those of the first and second contact areas, and wherein the third contact area's effect on the voltage state of the nets in the circuit is caused by a single event;
   e. adjusting the contact areas so that the opposing effects of a single event are of approximately equal magnitude, to substantially minimize the effect of the single event on the voltage state of the nets in the circuit;
   f. designing a mask layout of the integrated circuit, the mask layout based on the circuit layout designed using this method; and
   g. storing the mask layout in the data processing apparatus memory.

2. The method of designing a circuit layout of an electronic integrated circuit of claim 1, further comprising a non-transitory computer-readable medium storing a computer program for causing a computer to perform at least one of the steps in the method.

3. The method of claim 1, wherein the circuit has at least two nets carrying the same signal (or the signal and its inverse), where each of these nets have at least two contact areas for which a single event has an opposing effect on the voltage state of said two nets, comprising:
   a. placing a first contact area and a second contact area, each from a separate redundant net, for which a single event has the effect of changing the voltage state on the two redundant nets, wherein the first and second contact areas are non-adjoining, and placing a third contact area in between the first and second contact areas, said third contact area having an effect on the voltage state on at least one of the redundant nets, and wherein said effect of the third contact area is caused by a single event and opposes the effects of the first and second contact areas; and
   b. adjusting the strength of the effect of a single event on the placed contact areas in such a way that any single event that affects (passes through) the two redundant nets, at maximum can change the state of one of the nets, but never both nets.

4. The method of claim 1 or 2, wherein the circuit utilizes MOSFET devices, further comprising:
   a. identifying all MOSFET source (S) and drain (D) doping areas, which are not directly connected to the power-nets (VSS, VDD) as the contact areas of claims 1) and (2); and
   b. identifying the n-type MOSFET drains or sources, as contact areas for which a single event have the effect of pulling the voltage state, of the nets connected to this contact area, low, and the p-type MOSFET drains or sources, as contact areas for which a single event have the effect of pulling the voltage state, of the nets connected to this contact area, high.

5. The method of claim 3, further comprising:
   a. adding additional MOSFET devices between two nets, which at any time, carry opposite voltage states (high/low voltage level), in such a way that if one (first) of the nets is affected by a single event, such that its' voltage state is changed, then the additional MOSFET device turns on, connecting the two nets, and hence ensures that the state of the second net is not changed; and b. connecting the sources or drains of the p-type MOSFETs in the two nets by additional p-type MOSFETs with their gates connected to the high level power net (VDD), and connecting the sources or drains of the n-type MOSFETs in the two nets by additional n-type MOSFETs with their gates connected to the low level power net (VSS).

6. The method of claim 1, wherein the adjustment of the contact areas in the layout of the integrated circuit comprises adjusting at least one of the following: the size, the area, and the adjacency of the contact areas to other structures in the layout of the integrated circuit.

* * * * *